United States Patent
Sasaki (12)

(10) Patent No.: US 6,222,694 B1
(45) Date of Patent: *Apr. 24, 2001

(54) REPRODUCTION APPARATUS HAVING REDUCED DECODING ERROR RATE

(75) Inventor: Yoshiyuki Sasaki, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/736,602

(22) Filed: Oct. 24, 1996

Related U.S. Application Data

(63) Continuation of application No. 08/249,392, filed on May 26, 1994, now abandoned.

(30) Foreign Application Priority Data

May 31, 1993 (JP) .................................. 5-152979

(51) Int. Cl.[7] .......................... G11B 5/035; G11B 5/09; H03H 7/30
(52) U.S. Cl. ............................. 360/65; 360/46; 375/232
(58) Field of Search ................. 360/46, 65, 67, 360/68, 51; 369/53, 59; 371/5.4, 47.1; 375/230, 232

(56) References Cited

U.S. PATENT DOCUMENTS

| | | | |
|---|---|---|---|
| 4,217,562 | * 8/1980 | Rollett et al. | 333/28 R |
| 4,615,037 | * 9/1986 | Adler | 360/65 |
| 4,928,287 | * 5/1990 | Tanaka | 360/32 X |
| 4,991,034 | * 2/1991 | Sato | 360/32 X |
| 5,008,761 | * 4/1991 | Nishiyama et al. | 360/45 |
| 5,168,397 | * 12/1992 | Iwamura et al. | 360/65 |
| 5,172,381 | * 12/1992 | Karp et al. | 371/42 |
| 5,173,925 | * 12/1992 | Mizoguchi | 375/232 |
| 5,257,286 | * 10/1993 | Ray | 375/230 |
| 5,265,125 | * 11/1993 | Ohta | 360/65 X |
| 5,274,512 | * 12/1993 | Tanaka et al. | 360/65 |
| 5,335,121 | * 8/1994 | Bombeeck | 360/65 |
| 5,341,249 | * 8/1994 | Abbott et al. | 360/46 |
| 5,581,568 | * 12/1996 | Togami | 371/43 |
| 5,586,144 | * 12/1996 | Kahlman et al. | 360/65 |

\* cited by examiner

*Primary Examiner*—Hoa T. Nguyen
*Assistant Examiner*—Regina Y. Neal
(74) *Attorney, Agent, or Firm*—Morgan & Finnegan, LLP

(57) ABSTRACT

A reproduction apparatus for reproducing data, from a magnetic recording medium on which digital data is recorded, using a magnetic head, which includes a head amplifier which amplifies a reproduced signal obtained from the magnetic head, and has controllable resonance characteristics at least with respect to the magnetic head; an error correction decoding circuit for performing error correction by performing error detection of the reproduced signal obtained from the head amplifier; and a head amplifier control circuit for controlling the resonance characteristics of the head amplifier on the basis of an error detection signal obtained from the error correction decoding circuit.

18 Claims, 16 Drawing Sheets

D : ONE BIT DELAY $f_b$ : BIT FREQUENCY

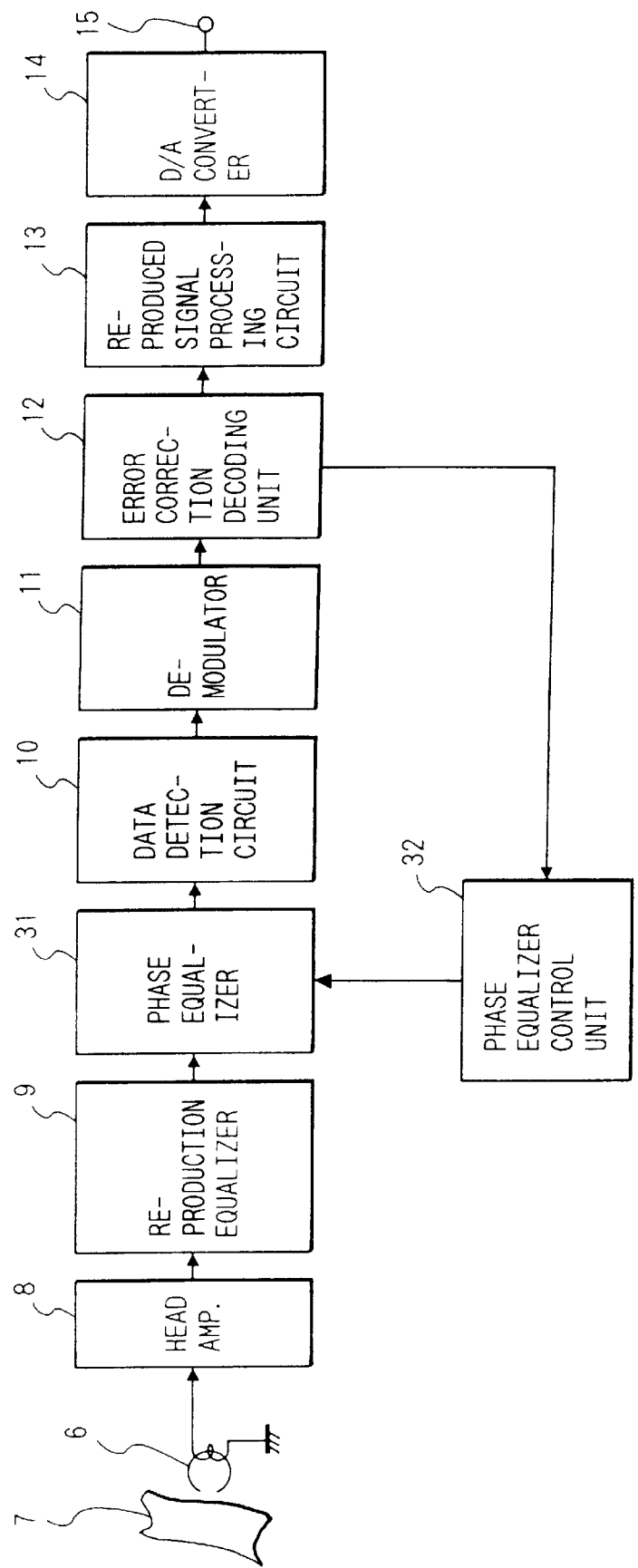

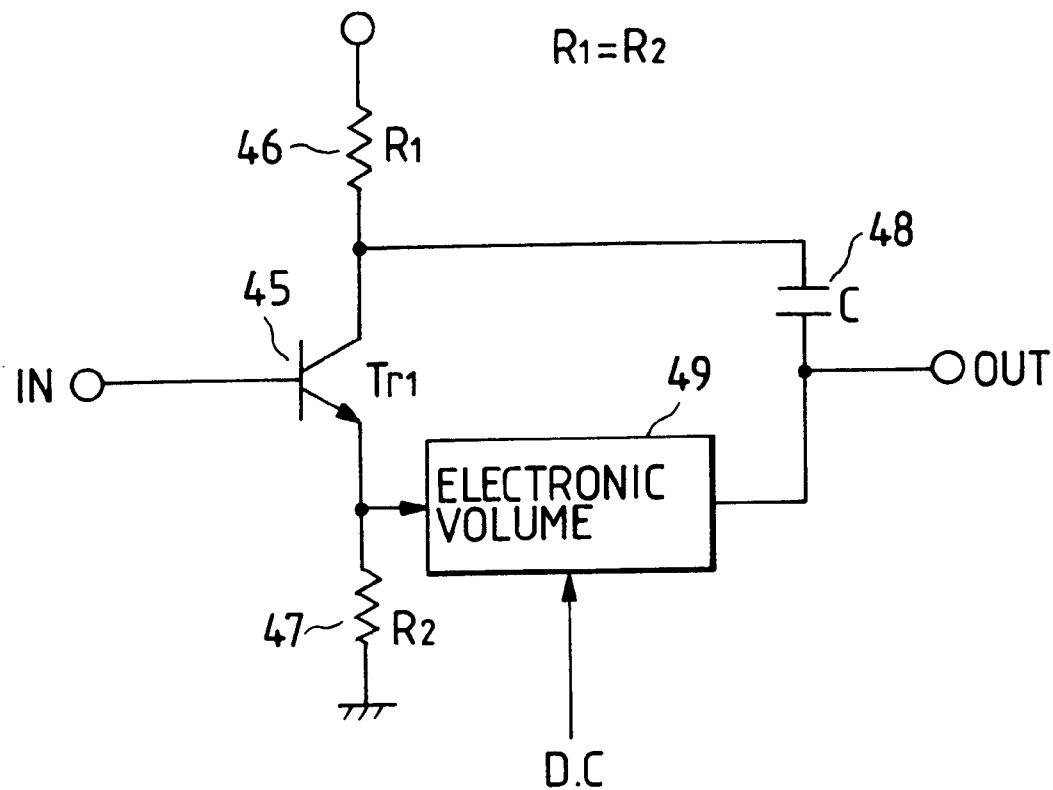

REPRODUCTION APPARATUS HAVING REDUCED DECODING ERROR RATE

This is a continuation of application Ser. No. 08/249,392, filed on May 26, 1994 now abandoned.

BACKGROUND OF THE INVENTION

1. Field of the Invention

The present invention relates to a reproduction apparatus such as a digital VTR for reproducing information from a magnetic recording medium on which information such as a video signal is digitally recorded and, more particularly, to a method of eliminating decoding errors.

2. Related Background Art

In a general digital VTR, error correction codes and the like are added to encoded data obtained by encoding an input signal in a recording mode, and the sum data are digitally modulated. Then, the modulated data is recorded on a recording medium such as a magnetic tape.

In a reproduction, a reproduced output obtained from the recording medium on which the data is recorded, as described above, via a magnetic head is amplified, and thereafter, the amplified data is reproduction-equalized. Then, processing such as digital demodulation, error correction, decoding, and the like is executed based on the equalized output.

In a digital VTR having the above-mentioned recording/reproduction system, the above-mentioned reproduction amplifier and the reproduction equalization have not been sufficiently examined yet as compared to data encoding/decoding and digital demodulation of a reproduced signal.

SUMMARY OF THE INVENTION

The present invention has been made in consideration of the above situation, and has as its object to provide a reproduction apparatus which can lower the error rate by improving a reproduction system.

According to a first embodiment of the invention, head amplifier control means for controlling the resonance characteristics of a head amplifier on the basis of an error detection signal obtained from error correction decoding means is arranged.

According to a second embodiment of the invention, reproduction equalizer control means for controlling the frequency characteristics of a reproduction equalizer on the basis of an error detection signal obtained from error correction decoding means is arranged.

According to a third embodiment of the invention, phase equalizer control means for controlling the phase characteristics of a phase equalizer on the basis of an error detection signal obtained from error correction decoding means is arranged.

According to a fourth embodiment of the invention, a synchronization phase control circuit for controlling the synchronization phase of reproduced data and a clock signal on the basis of an error detection signal obtained from error correction decoding means is arranged.

According to the first embodiment, the resonance characteristics of the head amplifier are controlled via the head amplifier control means so as to minimize the occurrence frequency of an error detection signal obtained from the error correction decoding means, thereby eliminating errors included in reproduced data before error correction.

According to the second embodiment, the frequency characteristics of the reproduction equalizer are controlled via the reproduction equalizer control means so as to minimize the occurrence frequency of an error detection signal obtained from the error correction decoding means, thereby eliminating errors included in reproduced data before error correction.

According to the third embodiment, the phase characteristics of the phase equalizer are controlled via the phase equalizer control means so as to minimize the occurrence frequency of an error detection signal obtained from the error correction decoding means, thereby eliminating errors included in reproduced data before error correction.

According to the fourth embodiment, the synchronization phase of reproduced data and a clock signal is controlled by the synchronization phase control circuit so as to minimize the occurrence frequency of an error detection signal obtained from the error correction decoding means, thereby eliminating errors included in reproduced data before error correction.

Other objects and features of the present invention will become apparent from the following specification and drawings.

BRIEF DESCRIPTION OF THE DRAWINGS

FIG. 20 is a block diagram showing the third embodiment;

FIG. 25 is a block diagram showing another arrangement of main part of the embodiment shown in FIG. 23.

DETAILED DESCRIPTION OF THE PREFERRED EMBODIMENTS

Figure 1:
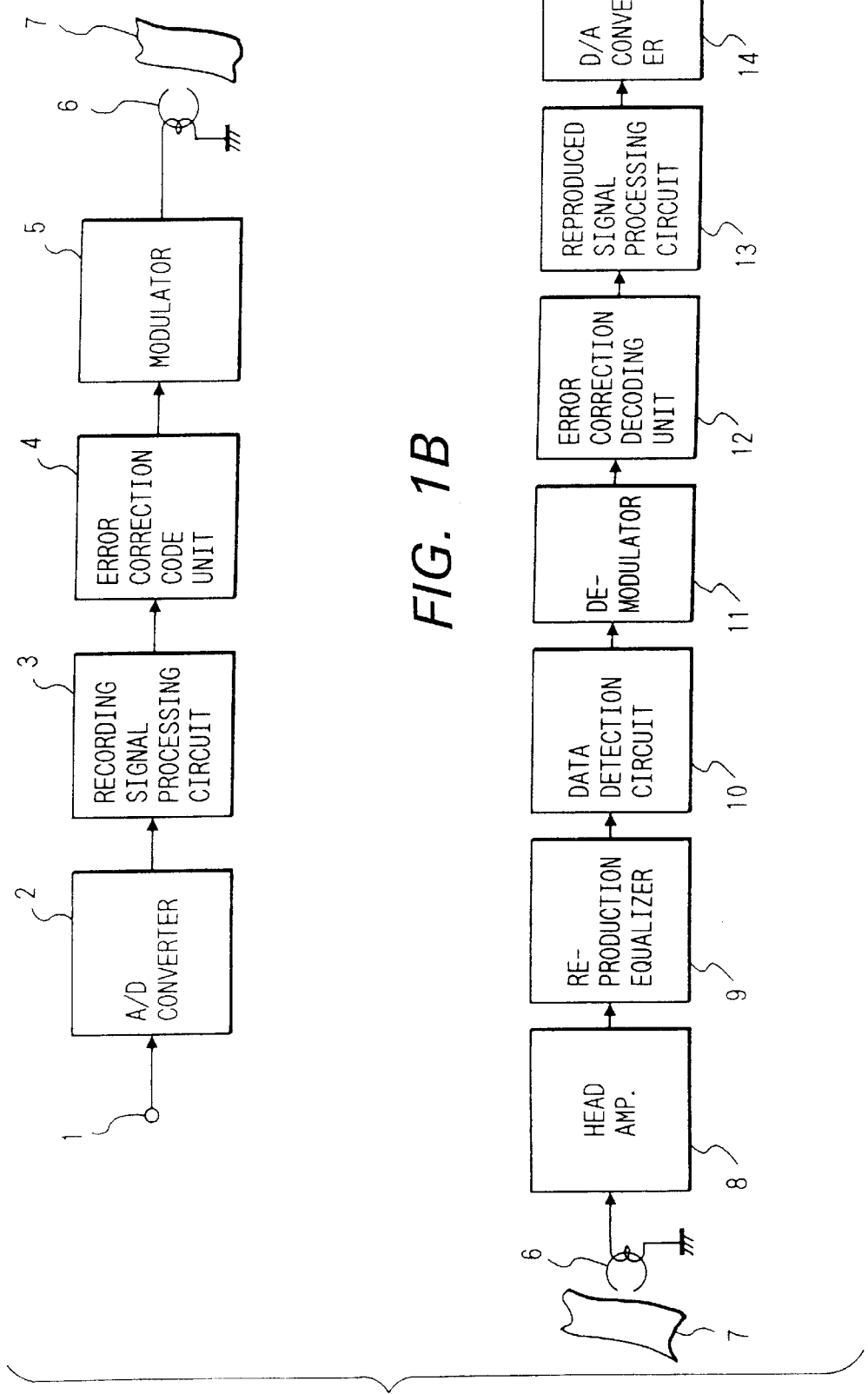
FIGS. 1A and 1B are block diagrams showing an example of a general digital VTR.

FIGS. 1A and 1B are block diagrams showing recording and reproduction systems in a digital VTR as an example of a magnetic recording/reproduction apparatus as a presupposition or basis of this embodiment.

A recording system includes an input terminal 1 for receiving a video signal, an A/D converter 2 for A/D-converting an input signal, a recording signal processing circuit 3 for converting a digital video signal into a signal suitable for recording/reproduction, an error correction code unit 4 for performing encoding for error correction, a modulator 5 for modulating an output from the error correction code unit 4, a magnetic head 6 used for recording/reproduction, and a magnetic tape 7.

A reproduction system includes a head amplifier 8 for amplifying a reproduced signal from the magnetic head 6, a reproduction equalizer 9 constituted by, e.g., a LC network and the like, having predetermined frequency characteristics, a data detection circuit 10 for converting an analog signal output from the reproduction equalizer 9 into a digital signal again, a demodulator 11, an error correction decoding unit 12 for performing error correction by detecting errors included in reproduced data, a reproduced signal processing circuit 13 for executing processing substantially opposite to that executed by the recording signal processing circuit 3, a D/A converter 14, and an output terminal 15.

The operation of the VTR will be described below. In a recording mode, an input video signal is A/D-converted by the A/D converter 2, and the digital video signal is supplied to the recording signal processing circuit 3. The video data which is simply A/D-converted has a very large information volume, and undesirably shortens a recording time. Thus, the digital video data is subjected to band compression such as DPCM (differential PCM), DCT (discrete cosine transform), and the like, and is compressed to an information volume of, for example, about ⅕ by the recording signal processing circuit 3.

Then, the compressed video data is subjected to encoding such as re-sorting of data, addition of an error correction parity, and the like by the error correction code unit 4, and the encoded data is modulated by the modulator 5. Thereafter, the modulated data is recorded on the magnetic tape 7 via the magnetic head 6.

Figure 2:
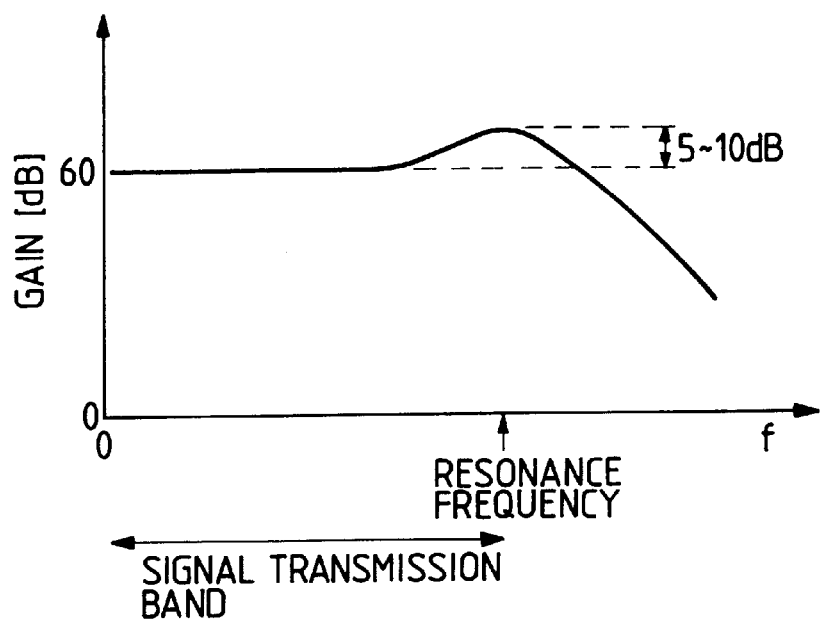
FIG. 2 is a graph for explaining the operation of the VTR shown in FIGS. 1A and 1B.

In the reproduction, a very weak reproduced signal obtained by the magnetic head 6 is amplified by 50 to 60 dB by the head amplifier 8. Note that the gain characteristics of the head amplifier 8 have resonance characteristics shown in FIG. 2 due to the inductance component of the magnetic head 6, the input capacitance of the head amplifier 8, and the capacitance component of wiring lines. The number of turns of the magnetic head 6 is selected, so that the peak frequency of the resonance characteristics is present near the upper limit of a transmission band.

Figure 3:
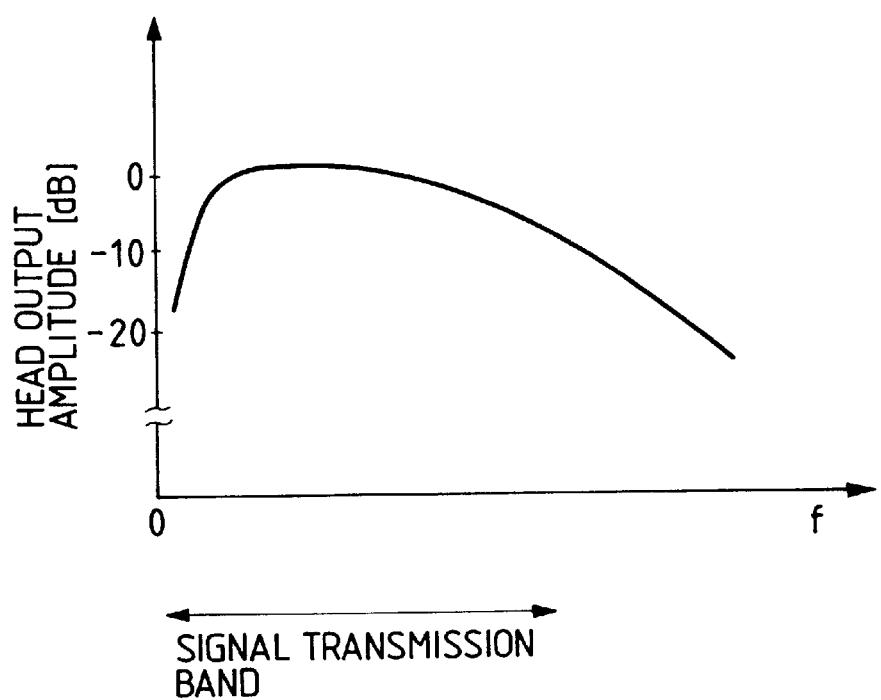
FIG. 3 is a graph for explaining the operation of the VTPR shown in FIGS. 1A and 1B.
Figure 4:
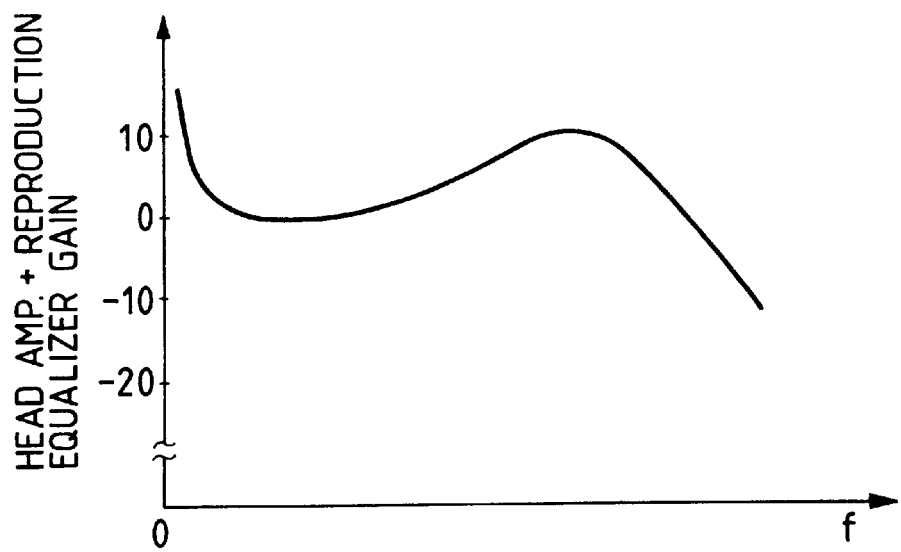
FIG. 4 is a graph for explaining the operation of the VTR shown in FIGS. 1A and 1B.

As shown in FIG. 3, the frequency characteristics of the amplitude of a reproduced signal from the magnetic head 6 correspond to differential characteristics in a low-frequency band, and correspond to attenuation characteristics in a high-frequency band due to various losses. Thus, inverse characteristics shown in FIG. 4 are formed by a combination of the resonance characteristics of the head amplifier 8 and the reproduction equalizer 9, thereby correcting the frequency characteristics of the output from the head 6.

The output signal from the reproduction equalizer 9 is compared with a predetermined threshold level by a comparator in the data detection circuit 10 so as to be converted into digital data again. The digital data is demodulated by the demodulator 11. At this time, when an input of the data detection circuit 10 includes a noise component exceeding the threshold level due to tape noise, amplifier noise at the input stage of the head amplifier 8, and the like, for example, data which should be detected to be "0" is erroneously detected to be "1", and causes an error.

The digital reproduced data including an error is subjected to error detection using the error correction parity added in the recording mode in the error correction decoding unit 12, and error correction is performed by inverting a bit which is determined to be an error. Then, the reproduced signal processing circuit 13 executes signal processing substantially opposite to that executed by the recording signal processing circuit 3, and the processed data is D/A-converted by the D/A converter 14, thus obtaining a reproduced video signal at the output terminal 15.

In the above-mentioned digital VTR, the head amplifier 8 and the reproduction equalizer 9 having fixed frequency characteristics are used. For this reason, when the frequency characteristics of the reproduced output of the magnetic head become different from those shown in FIG. 3 due to a change in humidity in a use environment, the manufacturer of the magnetic tape, a difference in magnetic materials, and the like, the number of errors included in the output from the data detection circuit 10 undesirably increases.

For this reason, according to the first embodiment, a head amplifier control unit for controlling the resonance characteristics of the head amplifier on the basis of an error detection signal obtained from the error correction decoding means is arranged.

According to the first embodiment, the resonance characteristics of the head amplifier are controlled via the head amplifier control unit so as to minimize the occurrence frequency of an error detection signal obtained from the error correction decoding unit, thereby eliminating errors included in reproduced data before error correction. The first embodiment will be described in detail below.

Figure 5:
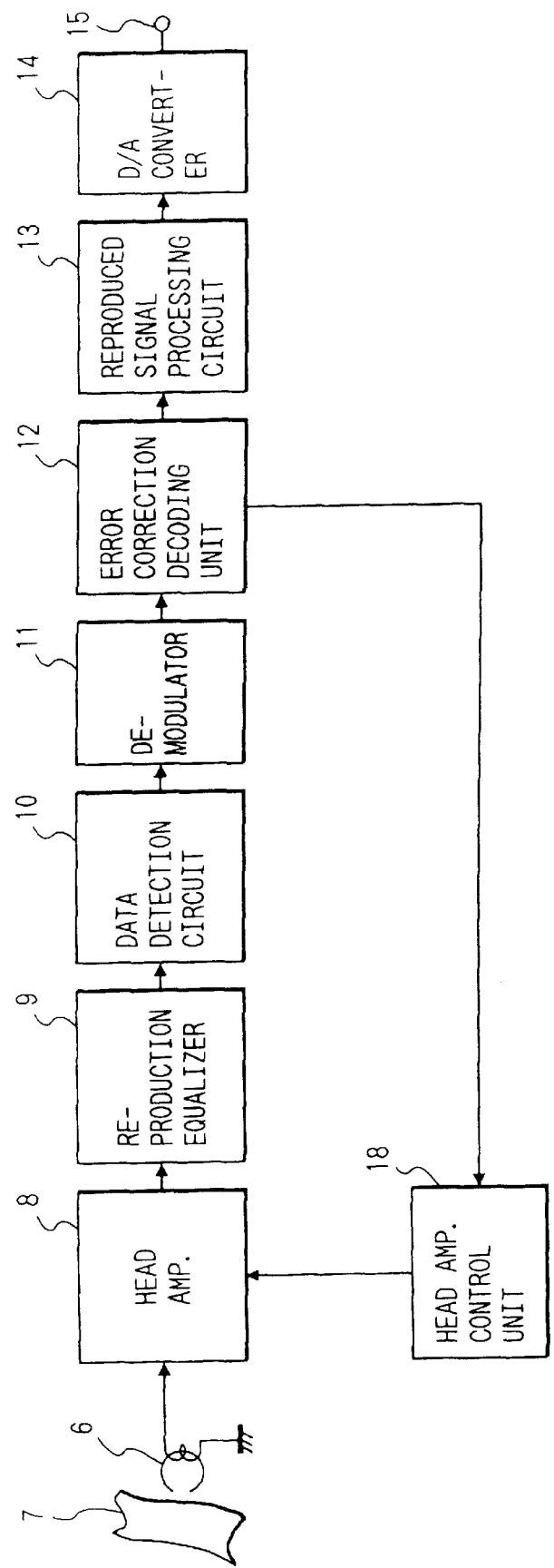
FIG. 5 is a block diagram showing the first embodiment of the present invention.

FIG. 5 is a block diagram showing a reproduction system according to the first embodiment. Note that the same reference numerals in FIG. 5 denote the same parts as in FIGS. 1A and 1B, and a repetitive description thereof will be avoided.

Referring to FIG. 5, the reproduction system includes a head amplifier 8 with controllable resonance characteristics, and a head amplifier control unit 18 for controlling the resonance characteristics of the head amplifier 8 on the basis of an error detection signal obtained from the error correction decoding unit 12.

Figure 6:
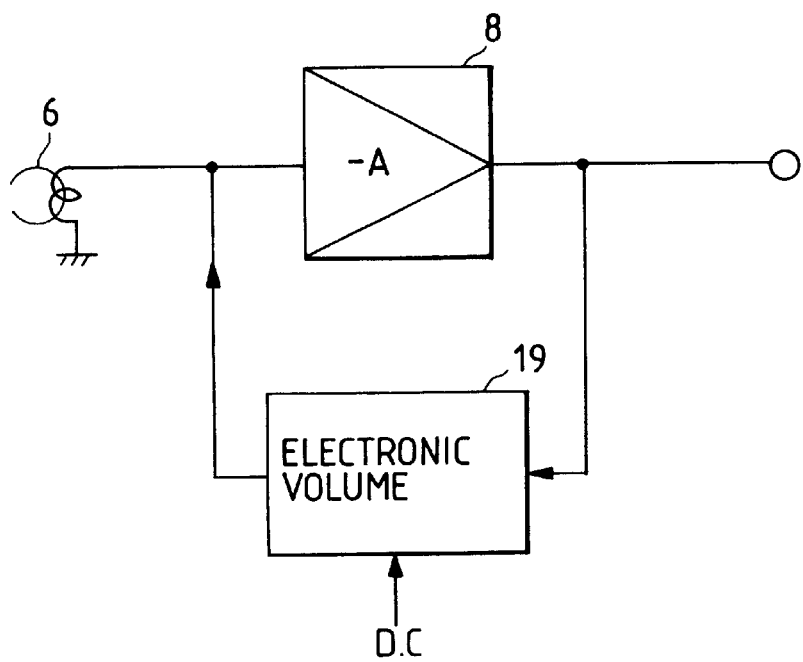
FIG. 6 is a block diagram showing the arrangement of main part of the first embodiment.

FIG. 6 shows the arrangement of the head amplifier 8 with controllable resonance characteristics, and the head amplifier control unit 18.

Referring to FIG. 6, an inverting amplifier 8 having a gain (−A times) for inverting the polarity of an output from that of an input is used as the head amplifier, and an electronic volume 19 is used as an example of the head amplifier control unit 18. In this embodiment, a circuit arrangement called "feedback damping" is adopted. That is, the output from the inverting amplifier 8 is negatively fed back via the electronic volume 19. Note that the electronic volume 19 is controlled by a DC voltage corresponding to an error detection signal.

According to the head amplifier 8 of this type, since the negative feedback amount increases at the peak point of the resonance frequency, the height of resonance can be controlled by properly adjusting the electronic volume 19. For example, resonance characteristics indicated by curves a and b in FIG. 7 can be controlled to a state without resonance characteristics, as indicated by a curve c in FIG. 7.

The operation of this system will be described below.

Figure 7:
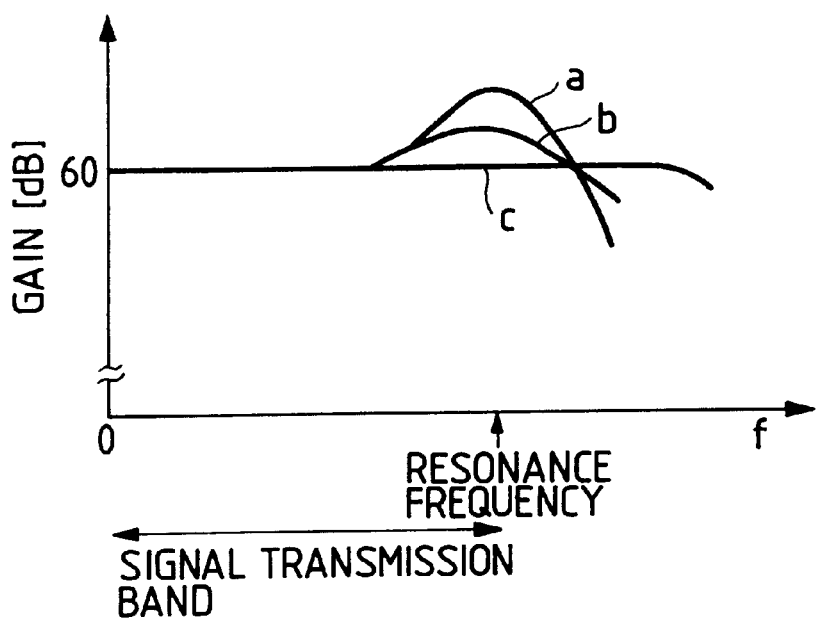
FIG. 7 is a graph showing the operation of the first embodiment.
Figure 8:
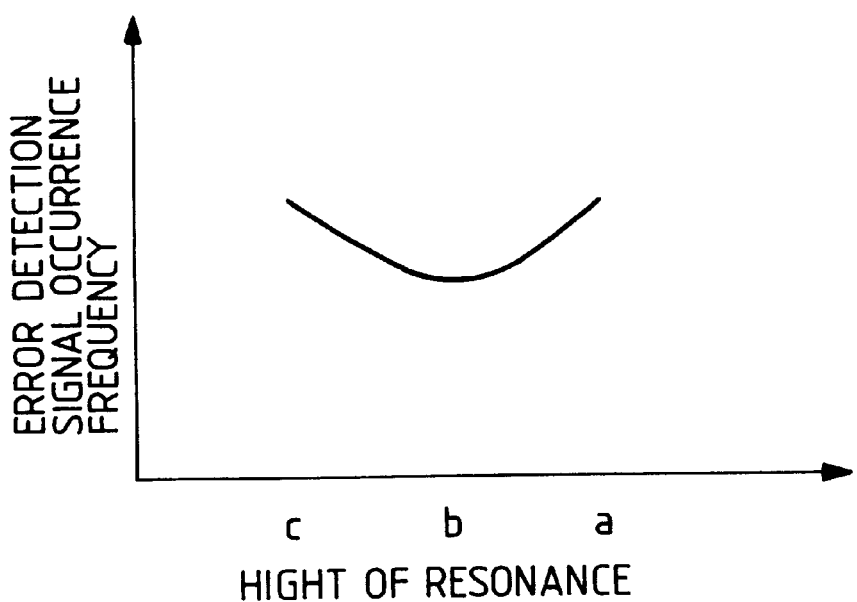
FIG. 8 is a graph showing the operation of the first embodiment.

The head amplifier control unit 18 monitors an error detection signal obtained from the error correction decoding unit 12 while changing, little by little, the height of the peak of the resonance characteristics shown in FIG. 7. Then, the control unit 18 executes so-called hill-climbing control shown in FIG. 8 by, e.g., a microcomputer (not shown) so as to minimize the occurrence frequency of an error detection signal.

Therefore, for example, when the frequency characteristics of the reproduced output from the magnetic head 6 change due to use of a tape with improved high-frequency characteristics, the height of resonance is suppressed to reduce high-frequency noise components, thereby eliminating errors included in reproduced data before error correction.

Figure 9:
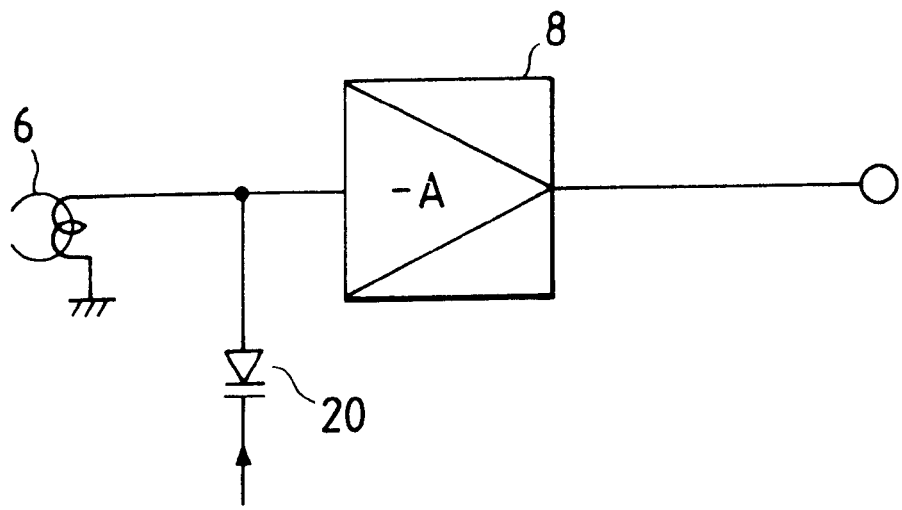
FIG. 9 is a block diagram showing another arrangement of main part of the first embodiment.

In the above embodiment, the arrangement for changing the height of the peak of the resonance frequency has been described. In order to change the resonance frequency, as shown in FIG. 9, a variable-capacitance diode 20 as the head amplifier control unit may be connected to the input of the head amplifier 8, and its capacitance may be changed by a DC voltage.

Figure 10:
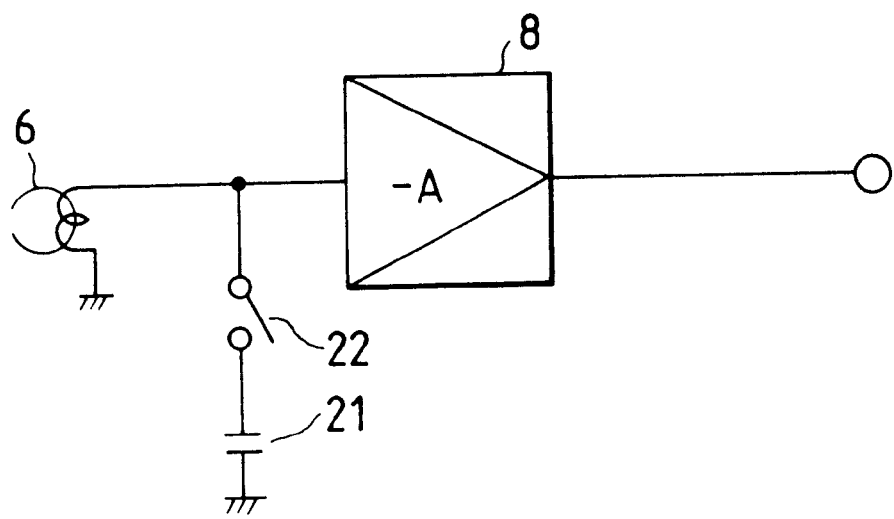
FIG. 10 is a block diagram showing still another arrangement of main part of the first embodiment.

Also, as shown in FIG. 10, a capacitor 21 may be arranged in parallel with the input of the head amplifier 8, and may be connected thereto via a switch 22, thus providing the same effect as in the above embodiment.

The second embodiment will be described below.

Figure 11:
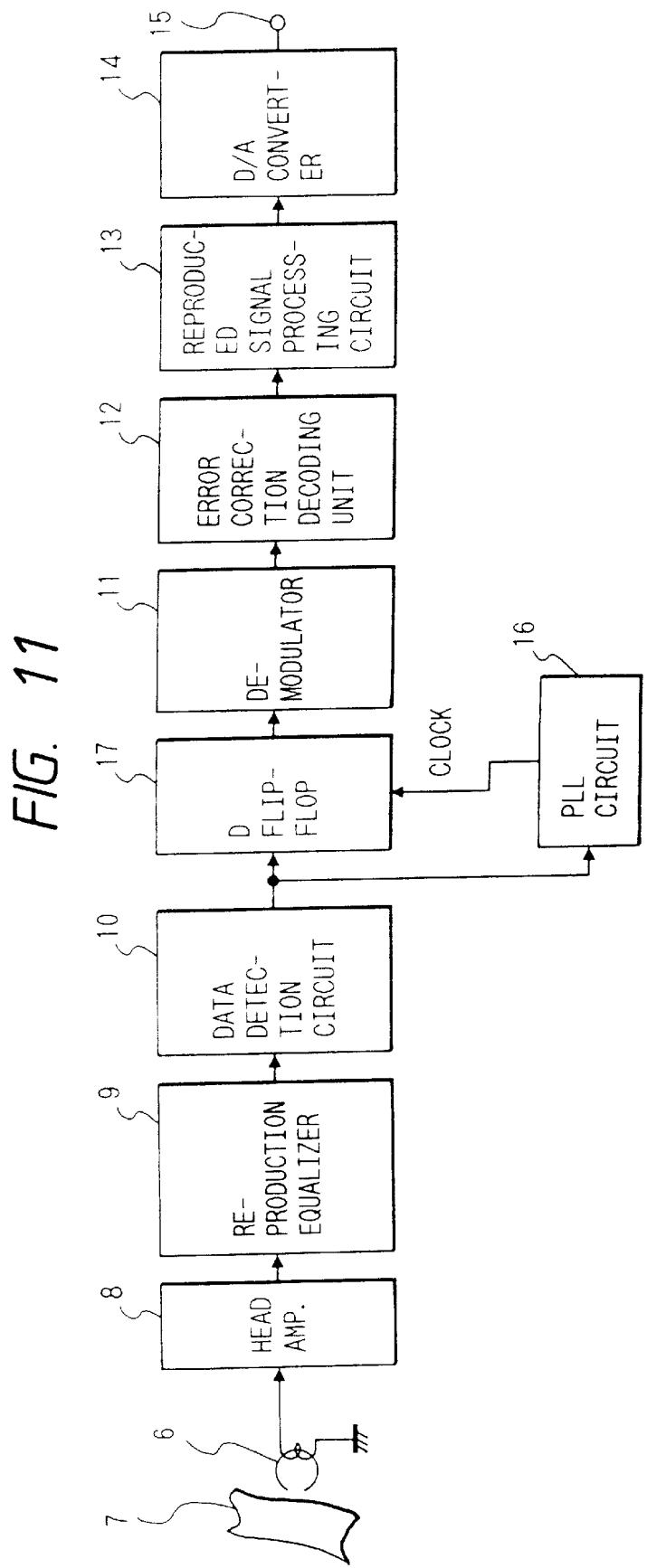
FIG. 11 is a block diagram showing another example of a general digital VTR.

FIG. 11 is a block diagram showing a reproduction system as a presupposition of the second embodiment.

Referring to FIG. 11, the reproduction system includes a PLL circuit 16 for generating a clock signal synchronous with the output from the data detection circuit 10, and a D flip-flop 17 for latching the output from the data detection circuit 10 in response to the clock signal generated by the PLL circuit 16, and supplying the latched data to the demodulator 11.

Figure 12:
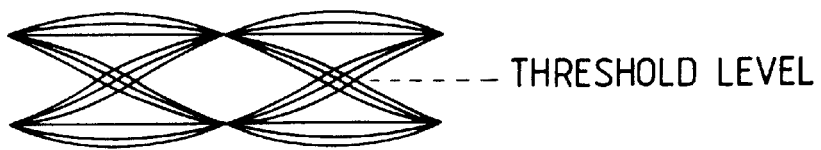
FIG. 12 is a graph for explaining the operation of the VTR shown in FIG. 11.

The reproduction equalizer 9 of this type adopts an equalization mode called an integrating mode for recovering a waveform before recording by integrating an input waveform so as to correct the differential characteristics of the magnetic recording system. The output waveform (eye pattern) of the integrating mode reproduction equalizer 9 is as shown in FIG. 12, and is converted by the data detection circuit 10 into digital data using, e.g., a comparator whose threshold level is selected to be a level near the center of the eye pattern.

On the other hand, the PLL circuit 16 generates a clock signal synchronized with the output from the data detection circuit 10. The output from the data detection circuit 10 is latched by the clock signal using the D flip-flop 17, and after the latched data is demodulated by the demodulator 11, the demodulated data is supplied to the error correction decoding unit 12.

Figure 13A:
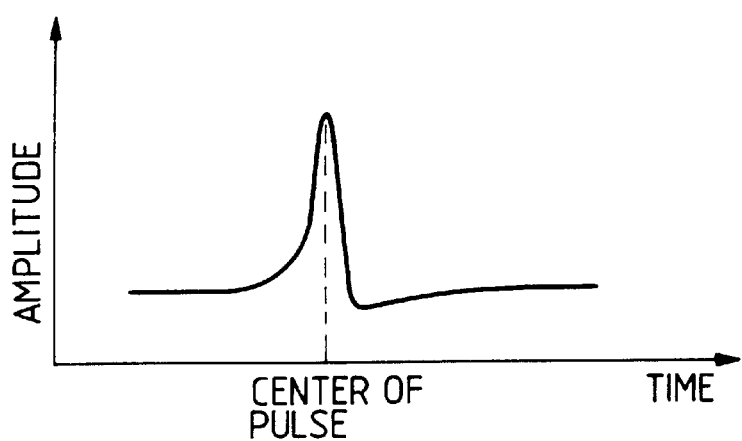
FIGS. 13A and 13B are graphs for explaining the operation of the VTR shown in FIG. 11.
Figure 13B:
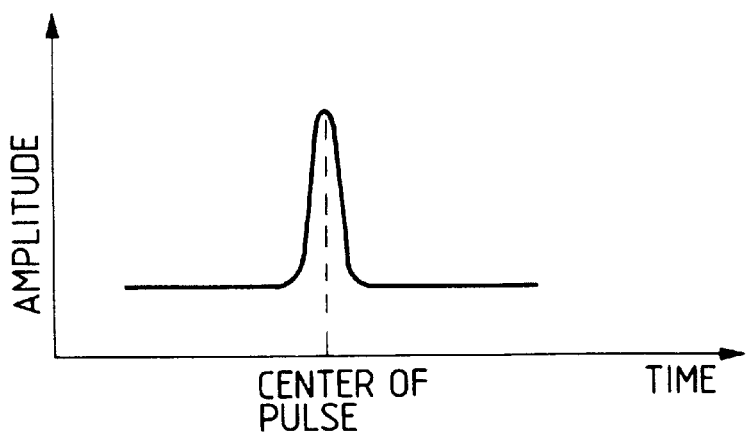

In recent years, metal evaporated tapes (ME tapes) have been developed for high-density recording, and as their characteristics, high-frequency outputs higher by several dB than those of conventional metal pigment or powder tapes (MP tapes) can be obtained. However, in the ME tape, a so-called vertical component of residual magnetization is strong, and in particular, its low-frequency component causes distortion of a reproduced waveform of an isolated wave, as shown in FIG. 13A. For this reason, in an actual reproduction system, a phase equalizer is arranged at the output side of the reproduction equalizer 9 so as to correct the phase of the low-frequency component to obtain a reproduced waveform, as shown in FIG. 13B.

However, the vertical component changes drastically depending on a difference in tape structure (e.g., a two- or three-layered structure of the ME tape) or a change in recording current. When the phase characteristics of the phase equalizer are not optimal ones, the distortion of the waveform cannot be satisfactorily corrected. As a result, many errors are included in reproduced data as an output from the data detection circuit 10.

Under these circumstances, in the second embodiment, a reproduction equalizer control unit for controlling the frequency characteristics of the reproduction equalizer on the basis of an error detection signal obtained from the error correction decoding unit is arranged.

According to the second embodiment, the frequency characteristics of the reproduction equalizer are controlled via the reproduction equalizer control unit so as to minimize the occurrence frequency of an error detection signal obtained from the error correction decoding unit, thereby eliminating errors in reproduced data before error correction.

Figure 14:
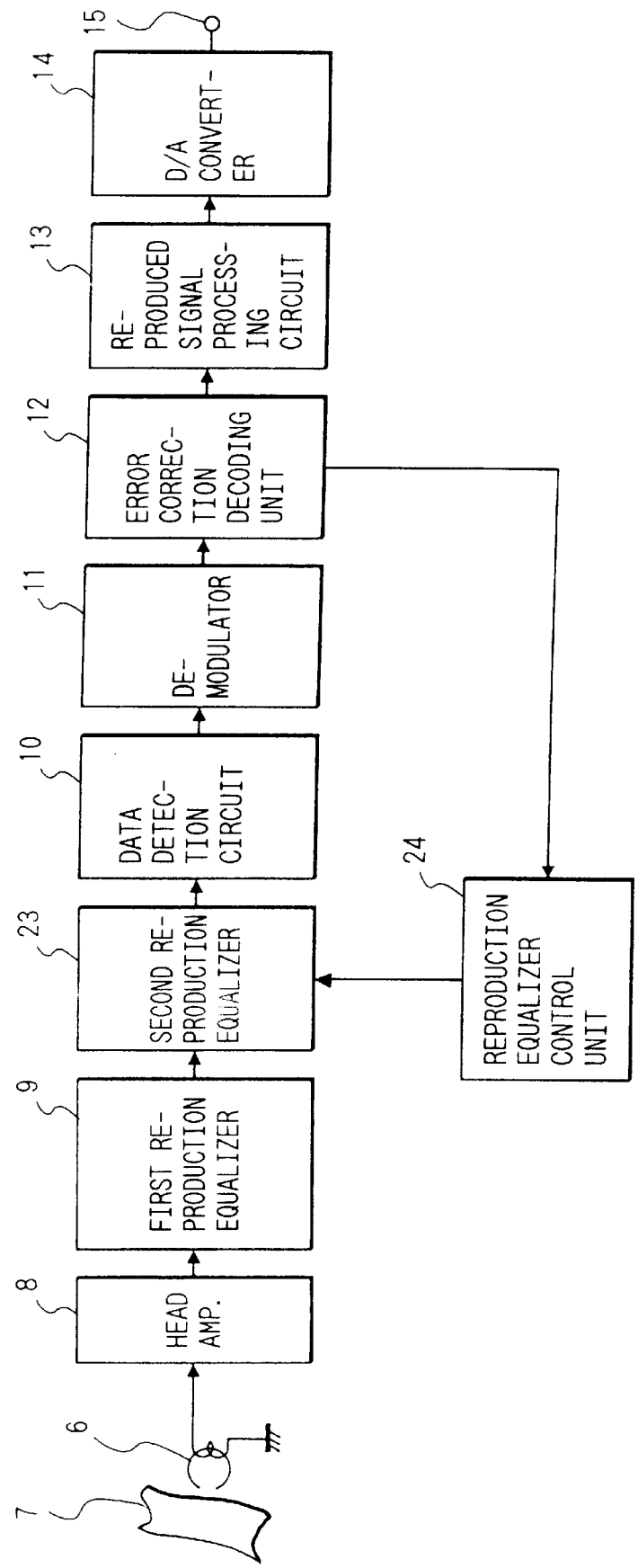
FIG. 14 is a block diagram showing the second embodiment.

FIG. 14 is a block diagram showing a reproduction system according to the second embodiment. Differences from FIGS. 1A and 1B will be explained below.

The reproduction system includes a second reproduction equalizer 23 with controllable frequency characteristics, and the conventional reproduction equalizer 9 will be referred to as a first reproduction equalizer hereinafter. The reproduction system also includes a reproduction equalizer control unit 24 for controlling the frequency characteristics of the second reproduction equalizer 23 on the basis of an error detection signal obtained from the error correction decoding unit 12.

Figure 15:
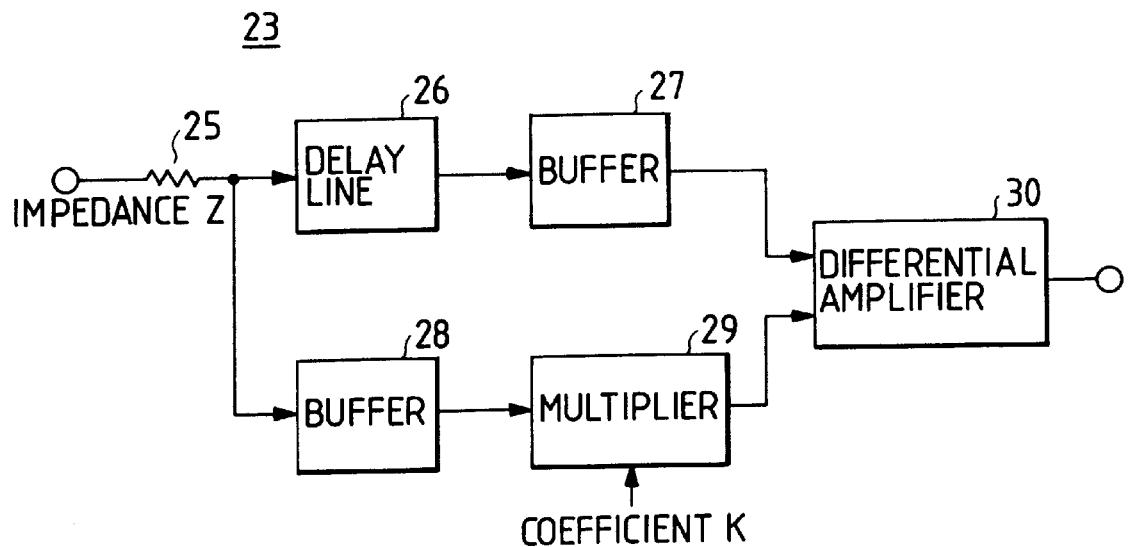
FIG. 15 is a block diagram showing the arrangement of main part of the second embodiment.

FIG. 15 shows the arrangement of the second reproduction equalizer 23. and the reproduction equalizer control unit 24. Referring to FIG. 15, the arrangement includes a matching resistor 25, a delay line 26, high-impedance buffers 27 and 28, a multiplier 29 serving as a part of the reproduction equalizer control unit 24 and having a coefficient K, and a differential amplifier 30.

The operation of the system will be described below.

The buffer 27 receives a signal obtained by delaying an input signal by a time t by the delay line 26. The buffer 28 receives an input signal and a signal which is delayed by a time 2t since it is reflected and returned due to the high input impedance of the buffer 27. The output from the buffer 28 is multiplied with the coefficient K by the multiplier 29, and the product is supplied to the differential amplifier 30 together with the output from the buffer 27. Transfer characteristics G up to the output of the differential amplifier 30 with respect to an input signal are given by:

$$G = (1 - 2k \cos \omega t) e^{j\omega t} \quad (1)$$

Figure 16:
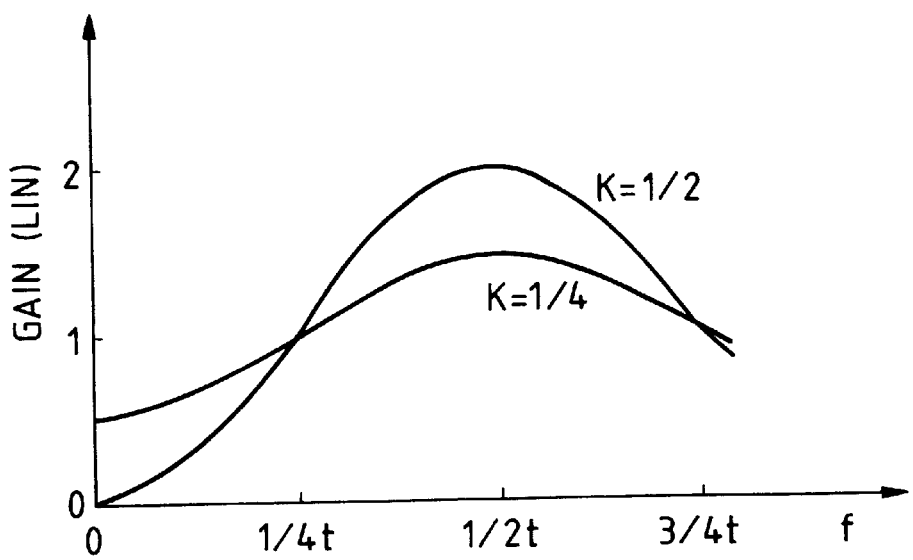
FIG. 16 is a graph showing the operation of the second embodiment.

Although the output is delayed by the time t, a phase distortion can be prevented even when the amplitude characteristics are changed. FIG. 16 shows the frequency characteristics for the coefficient K.

The high-frequency emphasis amount can be controlled by selecting the delay time t, so that the upper limit of the use range of the reproduction equalizer is given by f=½t, and by changing the coefficient K.

An error detection signal obtained from the error correction decoding unit 12 is monitored while changing the frequency characteristics of the second reproduction equalizer 23 by changing the coefficient K of the multiplier 29 little by little. In order to minimize the occurrence frequency of an error detection signal, the above-mentioned hill-climbing control is performed by, e.g., a microcomputer (not shown).

Therefore, for example, when the frequency characteristics of the reproduced output from the magnetic head 6 change due to a use of a tape with improved high-frequency characteristics, high-frequency noise components are reduced by suppressing the high-frequency emphasis amount of the second reproduction equalizer 23, thereby eliminating errors included in reproduced data before error correction.

In the above embodiment, the second reproduction equalizer 23 is arranged at the output side of the first reproduction equalizer 9. However, the same effect as in the above embodiment can be obtained as long as the two reproduction equalizers 9 and 23 are arranged at successive positions (for example, the second reproduction equalizer 23 is arranged at the input side of the first reproduction equalizer 9).

In the above embodiment, a transversal type circuit using a delay line has been exemplified as the second reproduction equalizer 23. However, the same effect as in the above embodiment can be expected as long as the second reproduction equalizer 23 adopts an arrangement with controllable frequency characteristics.

Figure 17:
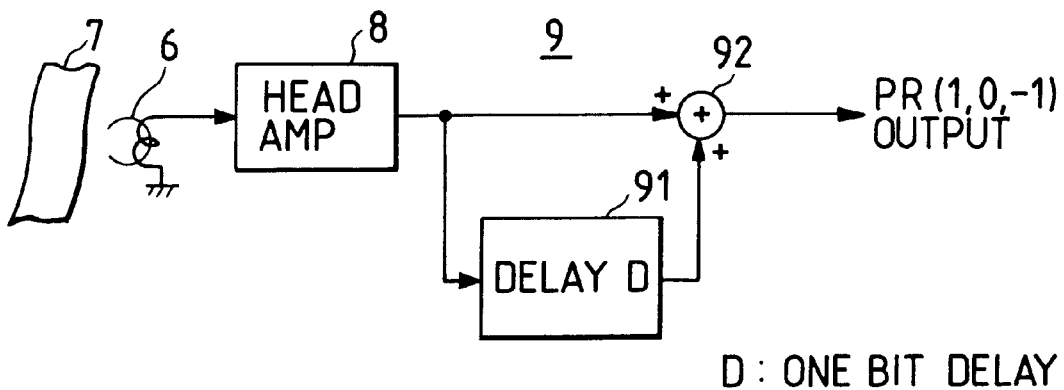
FIG. 17 is a block diagram showing the arrangement of main part of the other example of the general digital VTR.

The third embodiment will be described below. In recent years, in order to achieve high-density recording, as an equalization mode of a reproduction equalizer in a VTR, equalization modes, called partial response (PR) modes, which utilize inter-code interference of a reproduced waveform have been developed. FIG. 17 shows the arrangement the reproduction equalizer 9 which adopts a PR(1,0,−1) mode of these equalization modes. In this arrangement, the output from the head amplifier 8, and an output obtained by delaying the output from the head amplifier 8 by a 1-bit delay circuit 91 are added to each other by an adder 92.

Figure 18:
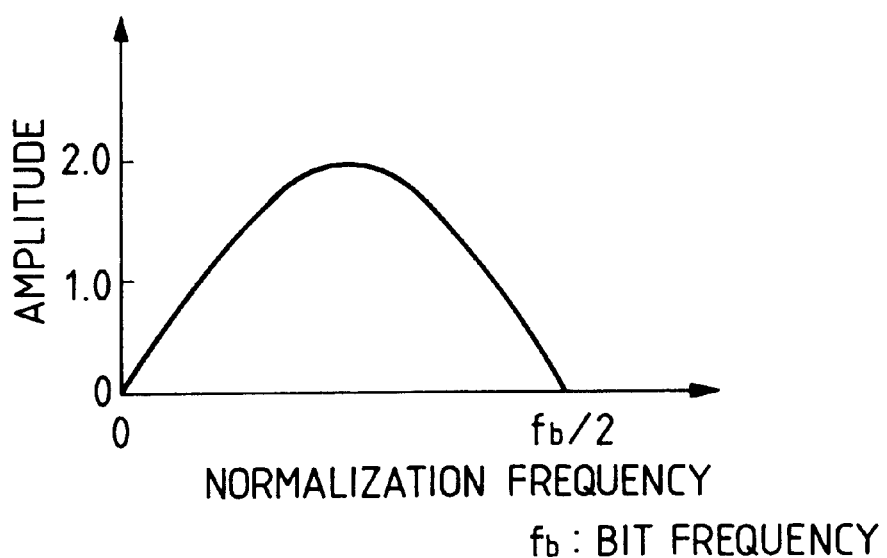
FIG. 18 is a graph for explaining the operation of the VTR shown in FIG. 17.

This PR(1,0,−1) mode is effective for metal evaporated tapes (ME tapes) which suffer from a particularly large phase distortion of low-frequency components since transfer characteristics required for a transmission path do not use low-frequency components, as shown in FIG. 18.

Figures 19A, 19B:
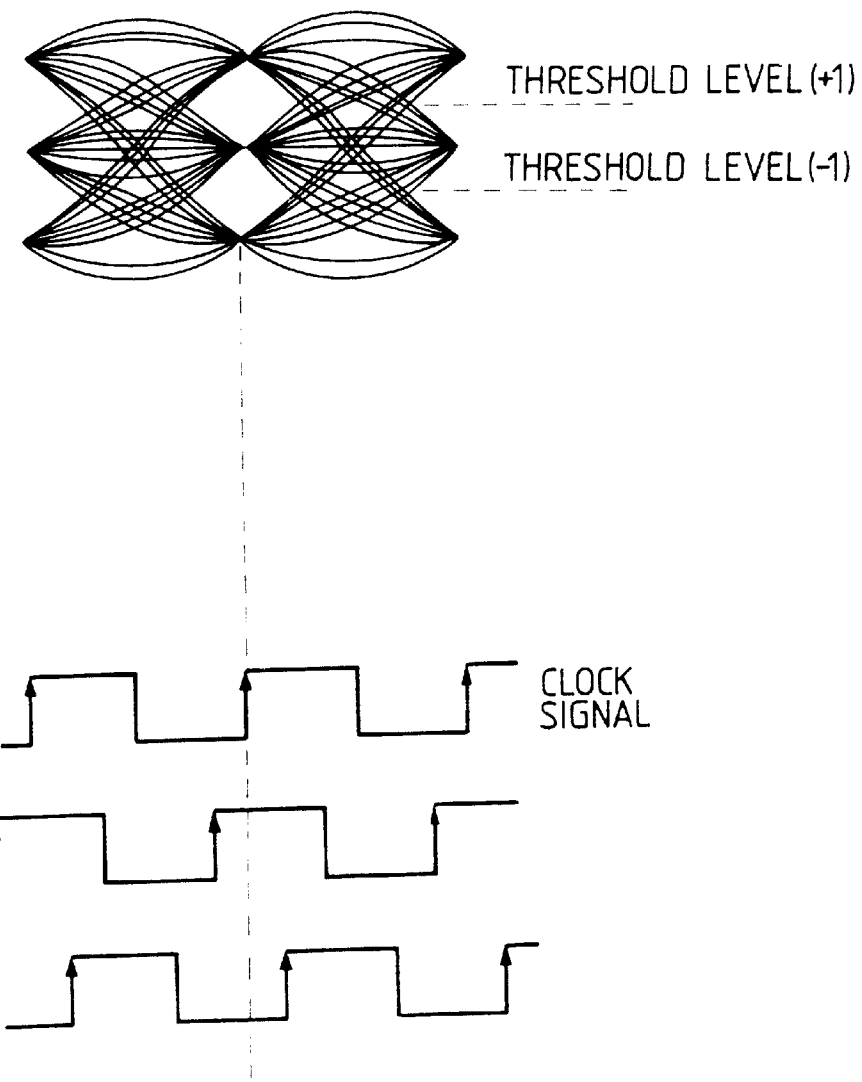
FIGS. 19A and 19B are graphs for explaining the operation of the VTR shown in FIG. 17.

Since a reproduced eye pattern of the PR(1,0,−1) mode is expressed by a three-value signal, as shown in FIG. 19A, data detection must be performed using two threshold levels +1 and −1.

As described above, since the reproduced eye pattern of the reproduction equalizer 9 of the PR(1,0,−1) mode shown in FIG. 17 is expressed by a three-value signal, as shown in FIG. 19A above, data detection must be performed using two threshold values. In this case, however, the reproduced eye pattern has small window widths in both the amplitude and time directions as compared to those of the integrating mode. In particular, when the synchronization phase of reproduced data and a clock signal is offset from an optimal timing shown in (a) of FIG. 19B, as shown in (b) and (c) of FIG. 19B, the number of decoding errors abruptly increases.

Note that the correction performance of the error correction decoding unit 12 is limited by the length of an error correction parity to be added, and the like. When errors occur at a frequency beyond the limit, errors which cannot be corrected appear as white dots in a reproduced image, resulting in an image with very poor appearance.

In view of this, the third embodiment has been made to solve the above-mentioned second problem, and has as its object to provide a reproduction apparatus which can correct a distortion of a reproduced waveform and can eliminate errors. In the third embodiment, a phase equalizer control unit for controlling the phase characteristics of the phase equalizer on the basis of an error detection signal obtained from the error correction decoding unit is arranged.

According to the third embodiment, the phase characteristics of the phase equalizer are controlled via the phase equalizer control unit so as to minimize the occurrence frequency of an error detection signal obtained from the error correction decoding unit, thereby eliminating errors in reproduced data before error correction.

FIG. 20 is a block diagram showing a reproduction system according to the third embodiment. Differences from the prior art shown in FIG. 1B will be described below.

Referring to FIG. 20, the reproduction system includes a phase equalizer 31 with controllable phase characteristics, and a phase equalizer control unit 32 for controlling the phase equalizer 31 on the basis of an error detection signal obtained from the error correction decoding unit 12.

Figure 21:
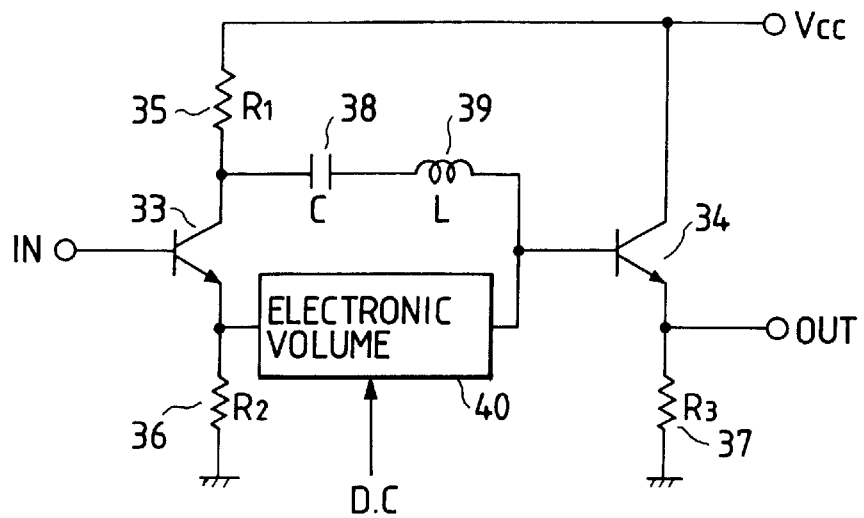
FIG. 21 is a block diagram showing the arrangement of main part of the third embodiment.

FIG. 21 shows the arrangement of the phase equalizer 31 and the phase equalizer control unit 32. Referring to FIG. 21, the arrangement includes transistors 33 and 34, resistors 351 36, and 37 respectively having resistances $R_1$, $R_2$, and $R_3$, a capacitor 38 having a capacitance C, an inductor 39 having an inductance L, and an electronic volume 40 as a part of the phase equalizer control unit 32.

If $R_1=R_2$, the amplitude characteristics of this circuit are always ×1 independently of the frequency. However, the frequency characteristics can be controlled to have, as the center, a frequency f given by:

$$f = \frac{1}{2\pi\sqrt{LC}} \quad (2)$$

Figure 22:
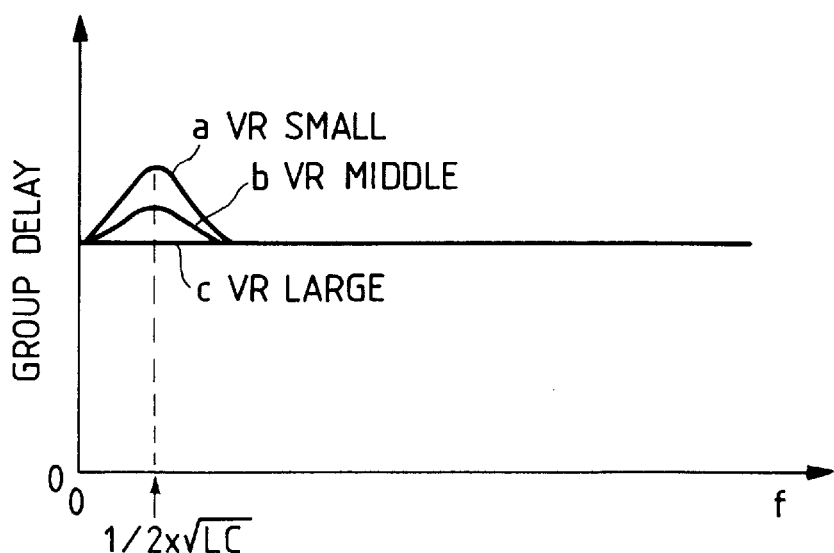
FIG. 22 is a graph showing the operation of the third embodiment.

FIG. 22 shows this control state as group delay characteristics. The group delay characteristics can be controlled, as indicated by curves a to c in FIG. 22, depending on the resistance of the electronic volume 40.

Phase correction of the vertical component is performed by selecting the capacitance C of the capacitor 38 and the inductance L of the inductor 39, so that the peak point of the group delay characteristics is adjusted to fall within the frequency region of the vertical component of an ME tape.

The operation of the system will be described below.

The phase equalizer control unit 32 monitors an error detection signal obtained from the error correction decoding unit 12 while changing the phase characteristics of the low-frequency band of the phase equalizer 31 by changing the resistance of the electronic volume 40 little by little. Then, hill-climbing control is performed by, e.g., a microcomputer (not shown) so as to minimize the occurrence frequency of an error detection signal.

Therefore, even when a reproduced waveform is distorted due to a change in strength of low-frequency components caused by, e.g., a difference in tape structure, it can be properly corrected, and errors included in reproduced data before error correction can be eliminated.

In the above embodiment, the arrangement using the phase equalizer 31, as shown in FIG. 21, has been exemplified. However, the same effect as in the above embodiment can be obtained even in other modes as long as a circuit adopts an arrangement with controllable phase characteristics.

In the above embodiment, the phase correction of the vertical component of an ME tape has been exemplified. However, for example, the same effect as in the above embodiment can be expected when the present invention is applied to other phase distortions such as correction of a high-frequency loss with a phase distortion such as a head core loss.

The fourth embodiment has been made to solve the same problems as in the third embodiment, and has as its object to provide a reproduction apparatus which can eliminate errors by controlling a synchronization phase of a clock signal and reproduced data.

For this purpose, in the fourth embodiment, a synchronization phase control circuit for controlling the synchronization phase of reproduced data and a clock signal on the basis of an error detection signal obtained from the error correction decoding unit is arranged.

According to the fourth embodiment, the synchronization phase of reproduced data and a clock signal is controlled by the synchronization phase control circuit so as to minimize the occurrence frequency of an error detection signal obtained from the error correction decoding unit, thereby eliminating errors in reproduced data before error correction.

The fourth embodiment will be described in detail below.

Figure 23:
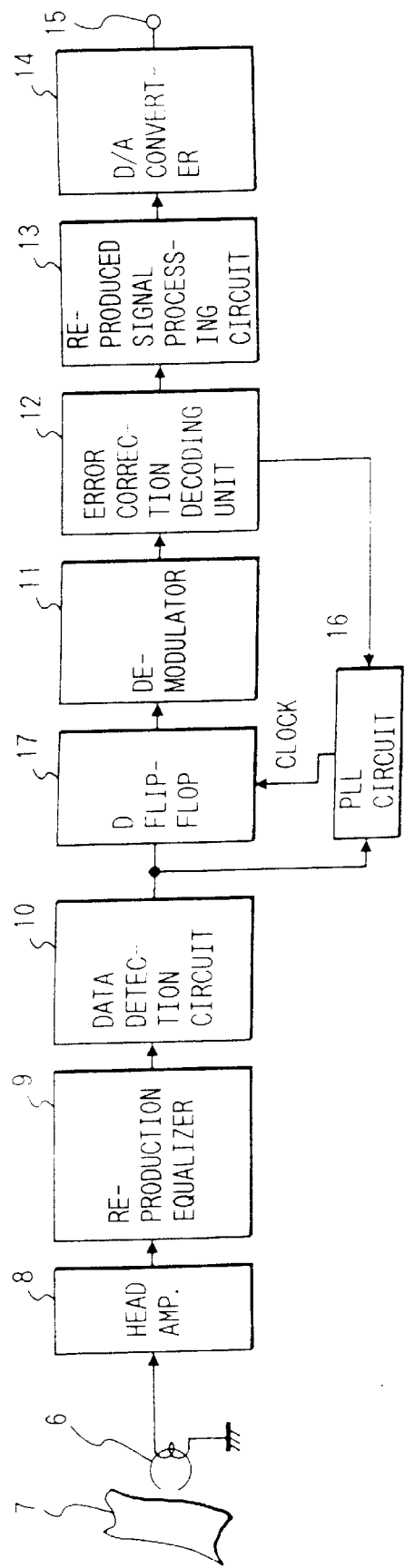
FIG. 23 is a block diagram showing the fourth embodiment.

FIG. 23 is a block diagram showing a reproduction system according to the fourth embodiment, and the same reference numerals in FIG. 23 denote the same parts as in FIG. 11.

Referring to FIG. 23, the PLL circuit 16 is controlled via a synchronization phase control circuit (to be described below) on the basis of an error detection signal obtained from the error correction decoding unit 12.

Figure 24:
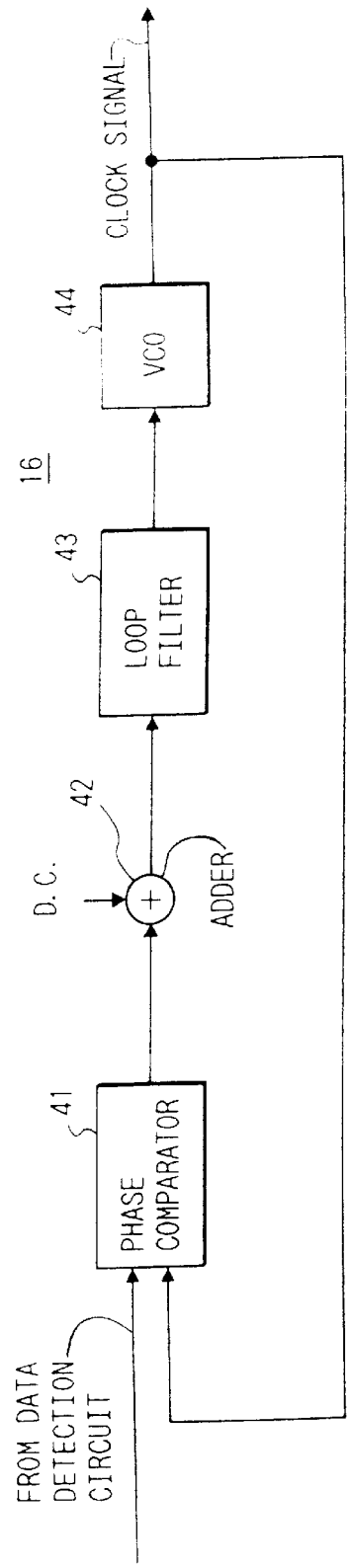
FIG. 24 is a block diagram showing the arrangement of main part of the embodiment shown in FIG. 23.

FIG. 24 shows the arrangement of the PLL circuit 16 and the synchronization phase control circuit. Referring to FIG. 24, the arrangement includes a phase comparator 41, an adder 42 as an example of the synchronization phase control circuit, a loop filter 43, and a voltage-controlled oscillator (VCO) 44.

The operation of the system will be described below.

The output from the data detection circuit 10 is supplied to the first input of the phase comparator 41, and a Clock signal output from the VCO 44 is supplied to the other input. The phase comparison output of the two input signals is negatively fed back to the voltage control input of the VCO 44 via the adder 42 and the loop filter 43, thus obtaining a clock signal synchronized with the output from the data detection circuit 10 in a certain phase relationship from the VCO 44. The output from the data detection circuit 10 is latched in response to this clock signal using the D flip-flop 17, and the latched output is supplied to the error correction decoding unit 12 after it is demodulated by the demodulator 11.

The synchronization phase of reproduced data and the clock signal can be controlled by a DC voltage to be applied to the adder 42, as shown in (a), (b), and (c) of FIG. 19. An error detection signal obtained from the error correction decoding unit 12 is monitored while changing the synchronization phase little by little. Then, hill-climbing control is performed by, e.g., a microcomputer (not shown) so as to minimize the occurrence frequency of an error detection signal.

Therefore, even when a synchronization phase is shifted from an optimal phase due to the temperature characteristics of the phase comparator 41, the VCO 44, and the like, it can be adjusted to a correct phase, and errors included in reproduced data before error correction can be eliminated.

In the above embodiment, the adder 42 is used as the synchronization phase control circuit, as shown in FIG. 24. Alternatively, as shown in FIG. 25, a phase shifter constituted by a transistor 45, resistors 46 and 47, a capacitor 48, and an electronic volume 49 may be inserted between the output of the VCO 44 and the input of the phase comparator 41. That is, the same effect as in the above embodiment can be obtained as long as the synchronization phase of reproduced data and a clock signal can be controlled.

In the above embodiment, the present invention is applied to the above-mentioned PR(1,0,−1) mode. However, required operations can be expected even when the present invention is applied to other equalization modes including the integrating mode.

In the above embodiments, an error correction algorithm is not particularly described. When product encoding consisting of inner and outer codes is performed to improve error correction performance, and an error detection signal of inner codes is mainly used, the effect of the present invention can be further enhanced.

As described above, according to the first embodiment, the resonance characteristics of the head amplifier are controlled based on an error detection signal.

According to the second embodiment, the frequency characteristics of the reproduction equalizer are controlled on the basis of an error detection signal.

Therefore, according to each of the first and second embodiments, even when the frequency characteristics of the reproduced output from the magnetic head change, high-frequency noise components can be reduced, and errors included in reproduced data before error correction can be eliminated. Thus, a satisfactorily reproduced image free from white dots on a screen can be obtained.

According to the third embodiment, since the phase characteristics of the phase equalizer are controlled on the basis of an error detection signal, the distortion of a reproduced waveform upon a change in low-frequency components can be corrected, and errors included in reproduced data before error correction can be eliminated. Thus, a satisfactorily reproduced image free from white dots on a screen can be obtained.

According to the fourth embodiment, since the synchronization phase of reproduced data and a clock signal is controlled on the basis of an error detection signal, the synchronization phase shift can be corrected, and errors included in reproduced data before error correction can be eliminated. Thus, a satisfactorily reproduced image free from white dots on a screen can be obtained.

What is claimed is:

1. A digital signal reproducing apparatus, comprising:
   (a) reproduction means for reproducing a signal from a magnetic recording medium;
   (b) first equalization means for adjusting a group delay of a target frequency of the signal reproduced by said reproducing means, a group delay characteristic of said first equalization means being variable, circuit components of said first equalization means being selected according to the target frequency;

(c) second equalization means for providing characteristic corresponding to partial response (1, 0, −1) to the signal reproduced by said reproducing means, said first and second equalization means being connected in series;

(d) detection means for detecting a digital signal from the signal having the characteristic corresponding to partial response (1, 0, −1) according to a clock signal; and (e) control means for varying the group delay characteristic of said first equalization means to adjust the group delay of the target frequency of the signal reproduced by said reproducing means by using the digital signal detected by said detection means.

2. An apparatus according to claim 1, wherein said magnetic recording medium is a magnetic tape, and wherein said reproduction means includes a head tracing said magnetic tape to reproduce the signal and head amplifier means.

3. An apparatus according to claim 1, further comprising:

conversion means for converting the reproduced signal into a digital signal, the reproduced signal being a signal whose amplitude effects analog change.

4. An apparatus according to claim 1, further comprising:

error detection means for detecting an error in the reproduced signal; and control means for controlling group delay characteristic of said first equalization means so as to reduce the error in the reproduced signal.

5. A signal detecting apparatus, comprising:

(a) reproduction means for reproducing a signal from a magnetic recording medium;

(b) first equalization means for adjusting a group delay of a target frequency of the reproduced signal, a group delay characteristic of said first equalization means being variable, circuit components of said first equalization means being selected according to the target frequency;

(c) second equalization means for equalizing the signal output from said first equalization means and outputting a signal indicating n-value data, wherein n is an integer of three or more, said first and second equalization means being connected in series;

(d) detection means for detecting a digital signal from the signal indicating n-value data according to a clock signal; and (e) control means for varying the group delay characteristic of said first equalization means to adjust the group delay of the target frequency of the reproduced signal by using the digital signal detected by said detection means.

6. An apparatus according to claim 5, wherein said second equalization means includes a delay circuit for delaying the signal output from said first equalization means by one bit and an addition circuit for adding the signal to be input to the delay circuit and the signal output from the delay circuit.

7. An apparatus according to claim 5, further comprising error correction means for correcting errors in the digital signal detected by said detection means and outputting an error detection signal indicating the errors, said control means controlling the group delay characteristic of said first equalization means according to the error detection signal output by said error correction means.

8. An apparatus according to claim 5, wherein the n-value signal has a characteristic corresponding to partial response (1, 0, −1).

9. An apparatus according to claim 5, wherein said control means varies the group delay characteristic in a frequency determined by a capacitance component and an inductance component of said first equalization means.

10. A signal processing device, comprising:

input means for inputting a signal reproduced by a reproducing head from a magnetic recording medium;

a phase equalizer for adjusting a group delay of a target frequency of the signal input by said input means, a group delay characteristic of the phase equalizer being variable, circuit components of said phase equalizer being selected according to the target frequency;

a n-value equalizer for processing the signal input by said input means and outputting a signal indicating n-value data, where n is an integer of three or more, the phase equalizer and the n-value equalizer being connected in series;

a data detector for detecting a digital signal from the signal indicating n-value data according to a clock signal; and control means for varying the group delay characteristic of the phase equalizer to adjust the group delay of the target frequency of the signal input by said input means by using the digital signal detected by the data detector.

11. A device according to claim 10, further comprising error correction means for correcting errors in the digital signal detected by said detector and for generating an error detection signal indicating the errors, said controlling means controlling the group delay characteristic of the phase equalizer according to the error detection signal generated by said error correcting means.

12. A device according to claim 10, further comprising a head amplifier for amplifying the signal input by said input means.

13. A signal processing apparatus comprising:

input means for inputting a signal reproduced from a recording medium;

equalization means for adjusting a group delay of a target frequency of the signal input by said input means and for outputting an adjusted signal indicating n-value data, where n is an integer of three or more, a group delay characteristic of said equalization means being variable, circuit component of said equalization means being selected according to the target frequency;

detection means for detecting a digital signal from the signal indicating n-value data output from said equalization means; and control means for varying the group delay characteristic of said equalization means to adjust the group delay of the target frequency of the signal input by said input means by using the digital signal detected by said detection means.

14. An apparatus according to claim 13, further comprising error correction means for correcting errors in the digital signal detected by said detection means and for generating an error detection signal indicating the errors, said control means controlling the group delay characteristic of said equalization means according to the error detection signal generated by said error correction means.

15. An apparatus according to claim 14, wherein said input means inputs the signal reproduced by a head from a magnetic tape.

16. An apparatus according to claim 13, wherein said equalization means includes a delay circuit for delaying a supplied signal and an addition circuit for adding the signal to be input to the delay circuit and the signal output from the delay circuit.

17. An apparatus according to claim 13, wherein the n-value signal has a characteristic corresponding to partial response (1, 0, −1).

18. An apparatus according to claim 13, wherein the target frequency is determined according to the recording medium.

* * * * *

UNITED STATES PATENT AND TRADEMARK OFFICE
CERTIFICATE OF CORRECTION

PATENT NO. : 6,222,694 B1  Page 1 of 1
DATED : April 24, 2001
INVENTOR(S) : Yashiyuki Sasaki It is certified that error appears in the above-identified patent and that said Letters Patent is hereby corrected as shown below:

<u>Column 8,</u>
Line 37, delete "351" and insert therefor -- 35 --

<u>Column 9,</u>
Line 52, delete "Clock" and insert therefor -- clock --

<u>Column 12,</u>
Line 53, delete "according to claim 14," and insert therefor -- according to claim 13, --

Signed and Sealed this

Twenty-fourth Day of September, 2002

*Attest:*

JAMES E. ROGAN
*Attesting Officer*    *Director of the United States Patent and Trademark Office*